US012676500B2

(12) United States Patent
Fang

(10) Patent No.: US 12,676,500 B2
(45) Date of Patent: Jul. 7, 2026

(54) DISTRIBUTED STANDBY POWER MANAGEMENT SWITCH SYSTEM AND METHOD OF USE THEREOF

(71) Applicant: JD POWER CO., LTD., New Taipei City (TW)

(72) Inventor: Jang-Chung Fang, New Taipei City (TW)

(73) Assignee: JD POWER CO., LTD., New Taipei City (TW)

( * ) Notice: Subject to any disclaimer, the term of this patent is extended or adjusted under 35 U.S.C. 154(b) by 206 days.

(21) Appl. No.: 18/582,674

(22) Filed: Feb. 21, 2024

(65) Prior Publication Data

US 2024/0297525 A1 Sep. 5, 2024

(30) Foreign Application Priority Data

Feb. 23, 2023 (TW) ................................. 112106644

(51) Int. Cl.
| | |
|---|---|
| *H02J 9/06* | (2006.01) |
| *H02J 3/0012* | (2026.01) |
| *H02J 13/10* | (2026.01) |
| *H02J 13/12* | (2026.01) |

(Continued)

(52) U.S. Cl.
CPC ............ *H02J 9/062* (2013.01); *H02J 3/0012* (2020.01); *H02J 9/068* (2020.01); *H02J 13/10* (2026.01); *H02J 13/12* (2026.01); *H02J 13/34* (2026.01); *H02J 13/1311* (2026.01); *H02J 13/1331* (2026.01)

(58) Field of Classification Search
CPC .......... H02J 9/062; H02J 3/0012; H02J 9/068; H02J 13/00001; H02J 13/00002; H02J 13/00036; H02J 13/00007; H02J 13/00022; H02J 9/06; H02J 9/061
See application file for complete search history.

(56) References Cited

U.S. PATENT DOCUMENTS

| | | | |
|---|---|---|---|
| 10,651,666 B2 * | 5/2020 | Toya ...................... | H01M 10/48 |
| 2003/0038546 A1 * | 2/2003 | Cho ......................... | H02J 9/062 |
| | | | 307/64 |

(Continued)

*Primary Examiner* — Rexford N Barnie
*Assistant Examiner* — Thai H Tran
(74) *Attorney, Agent, or Firm* — Leong C. Lei

(57) ABSTRACT

A distributed standby power management switch system and a method of use thereof are provided. The distributed standby power management switch system includes a power management switch, at least one standby power management switch, and a loading circuit. The power management switch is connected with the commercial power supply. The at least one standby power management switch is in communication connection with the power management switch and connected to a standby power supply set. Through the loading circuit and a wireless loop or cabled carrier wave to carry out electricity switching, the commercial power supply and the standby power supply set share the same loading circuit for automatically electricity switching. The power management switch and the standby power management switch of the distributed standby power management switch system may automatically switch with each other and may be set with timed switching or may be switched by using a portable device.

9 Claims, 12 Drawing Sheets

(51) Int. Cl.
    *H02J 13/13*          (2026.01)
    *H02J 13/34*          (2026.01)

(56)             References Cited

U.S. PATENT DOCUMENTS

2007/0168161 A1 *   7/2007   Vellore ................. G06Q 50/06
                                                    702/182
2010/0141036 A1 *   6/2010   Mehler ................... H02J 9/061
                                                    307/64

* cited by examiner first electromagnetic switch or second relay 15 first radio frequency module 13 first relay 14 first control unit 12 first power supply module 11

16

19

101

20 second power supply module 21 second control unit 22 second radio frequency module 23 third relay 24 second electromagnetic switch or fourth relay 25

201

202

29

26

204

DISTRIBUTED STANDBY POWER MANAGEMENT SWITCH SYSTEM AND METHOD OF USE THEREOF

BACKGROUND OF THE INVENTION

(a) Technical Field of the Invention

The present invention relates to a distributed standby power management switch system, and more particularly to a distributed standby power management switch system that enables automatic supply of electricity from a standby power source when a commercially available power supply is cut off and automatically cuts off the electricity supply from the standby power source and restores connection with the commercially available power supply when the commercially available power supply resumes supply of electricity.

(b) Description of the Prior Art

In the modern society, electrical power is required from homes to industrial workshops. However, once the largest electrical power supply source is cut off, meaning the commercially available electricity mains are interrupted, there will be living inconvenience. Thus, it is necessary to have standby power supplies ready in advance for maintaining a normal supply of electricity. Residents or office workers located in large building needs a large amount of electricity supply for livelihood power consumption. Electrical generators may be installed in order to ensure normal supply of livelihood power even when the commercially available power source fails or is interrupted. Consequently, a power supply switch device has to be built up for such a case that two electrical power sources, which are the commercially available power supply and the electrical generator, are available for use, in order to switch between the uses of the two electrical power sources.

A power supply switch device, which as noted above, is necessarily built up between the commercially available power supply and a standby power supply, is commonly a mechanical device. The mechanical power supply switch device is operated with a combination of a switch handle and a no fuse breaker (NFB), so that when the commercially available power supply is interrupted, the handle is pulled to switch the supply of electricity to the standby power supply. However, an erroneous manual operation of switching may accidentally cause connection to be simultaneously established with respect to both power supplies, and this leads to a potential safety concern.

SUMMARY OF THE INVENTION

The primary objective of the present invention is to provide a distributed standby power management switch system and a method of use thereof, wherein the distributed standby power management switch system supplies electricity in a normal situation where the commercial power supply is in normal operation, and the standby power supply set automatically supplies electricity when the commercial power supply is interrupted. Further, the commercial power supply resumes, the standby power supply automatically cuts off electricity supplied therefrom and supply of electricity is restored from the commercial power supply. Further, the distributed standby power management switch system according to the present invention does not allow simultaneous supply of nonsynchronous power supplies and does not consume power when not in operation, so as to achieve the purpose of saving cost and enhancing safety.

To achieve the above objective, the present invention provides a distributed standby power management switch system, which comprises a power management switch, at least one standby power management switch of a standby power supply set, and a loading circuit, wherein the power management switch is connected by means of an alternate-current power input terminal to a commercial power supply, and the power management switch comprises a first power supply module, a first control unit, a first radio frequency module, and a first relay, the first power supply module being electrically connected with the first control unit, the first radio frequency module and the first relay being electrically connected with the first control unit, the first relay being electrically connected with a first electromagnetic switch or a second relay. Further, the at least one standby power management switch is connected by means of a standby power activation connector and a standby power output terminal to a standby power supply set, and the at least one standby power management switch is in communication connection with the power management switch, and the at least one standby power management switch comprises a second power supply module, a second control unit, a second radio frequency module, and a third relay, the second power supply module being electrically connected with the second control unit, the second radio frequency module and the third relay being electrically connected with the second control unit, the third relay being electrically connected with a second electromagnetic switch or a fourth relay. Further, one end of the loading circuit is connected with a first loading terminal of the power management switch, and another end of the loading circuit is connected with a second loading terminal of the at least one standby power management switch. The first radio frequency module and the second radio frequency module are in communication connection with each other in a wireless manner, and the standby power supply set comprises a fuel cell set, a lithium battery set, a lead acid battery set, or an electrical generator.

In the distributed standby power management switch system according to the present invention, the first radio frequency module and the second radio frequency module are operable for transmission with cabled carrier wave through the loading circuit.

In the distributed standby power management switch system according to the present invention, the power management switch comprises a first sensor, which is operable to detect an electricity state of the power management switch and to generate a first detection signal to have the state of the power management switch displayed with a first LED light, and the at least one standby power management switch comprises a second sensor, which is operable to detect an electricity state of the at least one standby power management switch and to generate a second detection signal to have the state of the at least one standby power management switch displayed with a second LED light.

The distributed standby power management switch system according to the present invention further comprises a first data transmission element and a second data transmission element, the first data transmission element being arranged in the power management switch and electrically connected with the first control unit, the second data transmission element being arranged in the at least one standby power management switch and electrically connected with the second control unit, wherein the first data transmission element and the second data transmission element are operable to transmit the first detection signal and the second detection signal therebetween in a wireless manner; or alternatively, the first data transmission element and the second data transmission element are operable to use the loading circuit for transmission with cabled carrier wave, the first detection signal and the second detection signal being transmitted through the first data transmission element and the second data transmission element to a portable device in a wireless manner.

In the distributed standby power management switch system according to the present invention, the wireless manner comprises one of Bluetooth communication protocol, wireless network communication protocol, wireless RF communication, broadband network communication, Zigbee, Thread, 3G communication protocol, 4G communication protocol, or 5G communication protocol; or alternatively, using the loading circuit for transmission with cable carrier wave.

The distributed standby power management switch system according to the present invention further comprises a breaker, the breaker having one end connected with the commercial power supply source and another end electrically connected with the power management switch.

To achieve another objective mentioned above, the present invention provides a method of use of a distributed standby power management switch system. Firstly, a power management switch and at least one standby power management switch are provided, wherein the power management switch is connected by means of an alternate-current power input terminal to a commercial power supply, and the at least one standby power management switch is connected by means of a standby power activation connector and a standby power output terminal to a standby power supply set, the at least one standby power management switch and the power management switch being in communication connection with the standby power supply set. Next, a loading circuit is provided, wherein one end of the loading circuit is connected with a first loading terminal of the power management switch, and another end of the loading circuit is connected with a second loading terminal of the at least one standby power management switch. Further, a first sensor and a second sensor are provided, wherein the first sensor is arranged in the power management switch, and the second sensor is arranged in the at least one standby power management switch, the first sensor being operable to detect an electricity state of the power management switch and to generate a first detection signal to have the state of the power management switch displayed with a first LED light, the second sensor being operable to detect an electricity state of the standby power management switch and to generate a second detection signal to have the state of the at least one standby power management switch displayed with a second LED light. When the commercial power supply is present, the power management switch feeds electricity to the first loading terminal, and simultaneously, the first radio frequency module transmits the first detection signal to the second radio frequency module, indicating the electricity on the first loading terminal is supplied from the power management switch, the standby power supply set connected with the at least one standby power management switch being prohibited from supplying electricity.

In the method of use according to the present invention, when the commercial power supply is interrupted, the first sensor of the power management switch detects the interruption, and wireless communication between the first radio frequency module and the second radio frequency module confirms the interruption, and meanwhile the second loading terminal detects no electricity, confirming the commercial power supply is interrupted, and the standby power supply set is automatically activated to supply electricity to the second loading terminal, and along the loading circuit, and the first loading terminal of the power management switch also detects electricity, wherein under this condition, the standby power supply set supplies electricity.

In the method of use according to the present invention, when the commercial power supply resumes, the power management switch detects the commercial power supply, and the power management switch does not immediately feed the commercial power supply to the first loading terminal, and instead, firstly transmits the first detection signal to the at least one standby power management switch to request interruption of supply of electricity, and only after the standby power management switch completes execution of the interruption of supply of electricity and the second loading terminal detects no electricity, the power management switch feeds the commercial power supply to the first loading terminal.

In the method of use according to the present invention, the at least one standby power management switch, upon interrupting the supply of electricity, simultaneously activates a charger device to apply the commercial power supply to charge the standby power supply set, and after the charging is completed, the standby power supply set automatically shuts down the charger device.

DETAILED DESCRIPTION OF THE PREFERRED EMBODIMENTS

Figure 1A:
FIG. 1A is a schematic view showing supply of electricity from a commercial power supply in a distributed standby power management switch system according to the present invention.
Figure 1B:
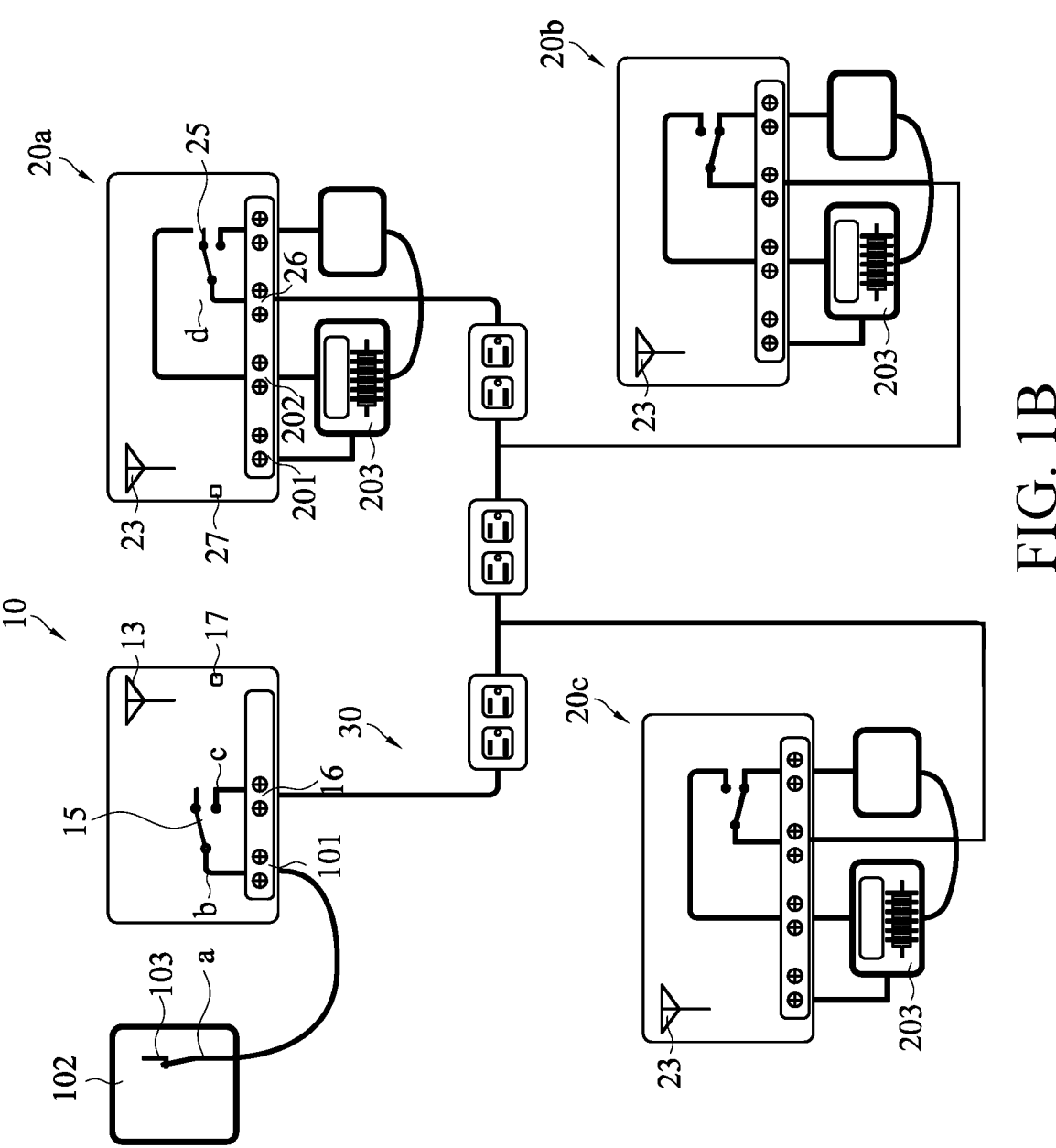
FIG. 1B is a schematic view showing interruption of electricity from a commercial power supply in the distributed standby power management switch system according to the present invention.
Figures 2A, 2B, 2C, 2D, 2E:
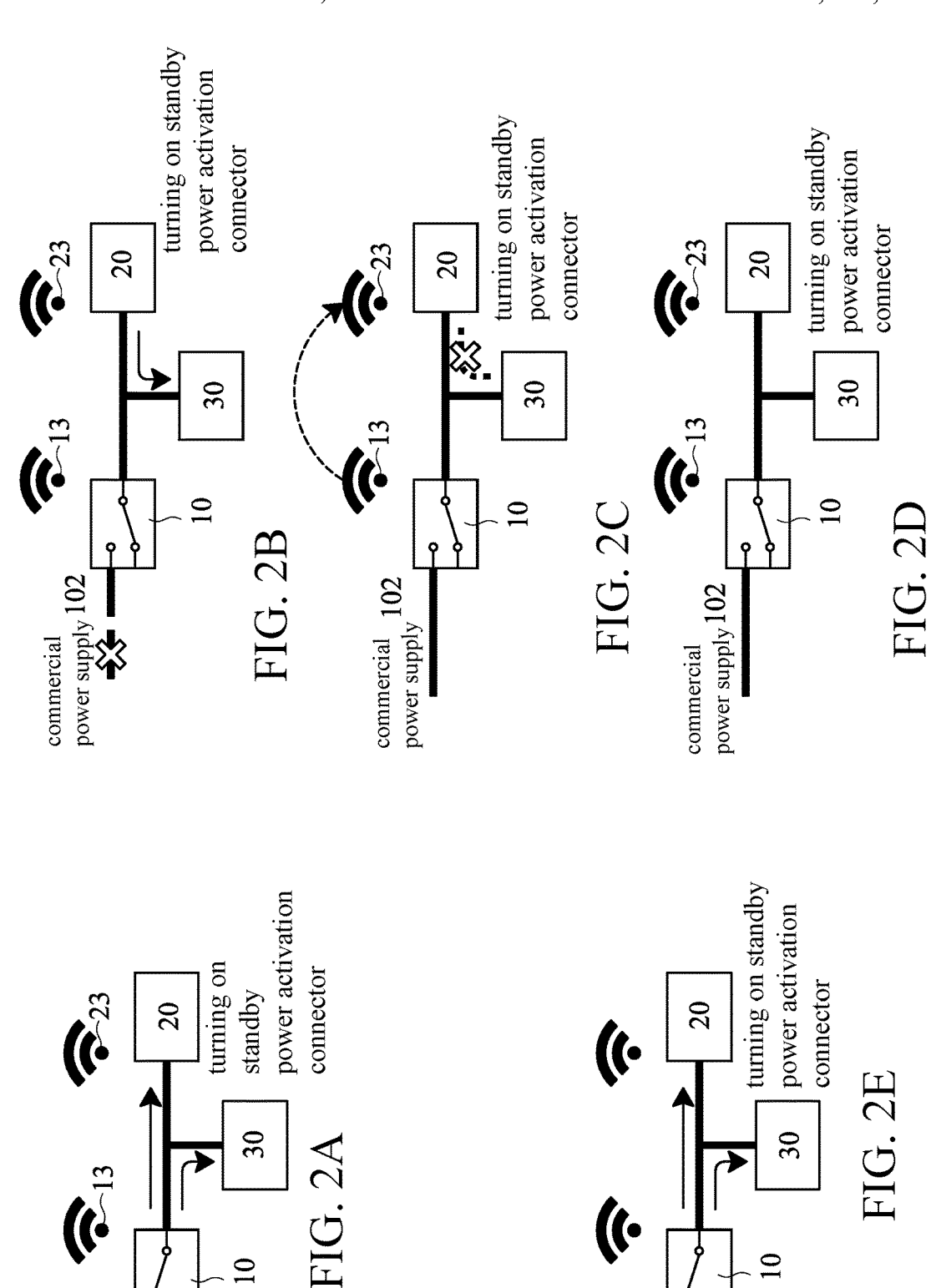
FIGS. 2A-2E are schematic views showing an operation flow of the distributed standby power management switch system according to the present invention.
Figure 3:
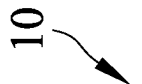
FIG. 3 is a schematic view showing interior of a power management switch of the present invention.
Figure 4:
FIG. 4 is a schematic view showing interior of a standby power management switch of the present invention.

Referring to FIGS. 1A-4, FIG. 1A is a schematic view showing supply of electricity from a commercial power supply in a distributed standby power management switch system according to the present invention; FIG. 1B is a schematic view showing interruption of electricity from a commercial power supply in the distributed standby power management switch system according to the present invention; FIGS. 2A-2E are schematic views showing an operation flow of the distributed standby power management switch system according to the present invention; FIG. 3 is a schematic view showing interior of a standby power management switch of the present invention; and FIG. 4 is a schematic view showing interior of a power management switch of the present invention.

As shown in FIGS. 1A-4, the present invention provides a distributed standby power management switch system 1, which comprises a power management switch 10, at least one standby power management switch 20, and a loading circuit 30. The power management switch 10 is connected by an alternate-current power input terminal 101 to a commercial power supply 102. The power management switch 10 comprises a first power supply module 11, a first control unit 12, a first radio frequency module (RF433 MHz) 13, and a first relay 14. The first power supply module 11 is for input of power supply input and detection of a state of the loading circuit 30. The first control unit 12 is for reading of a peripheral state, logical operation, and control of an output operation. The first power supply module 11 is electrically connected with the first control unit 12. The first radio frequency module 13 and the first relay 14 are electrically connected with the first control unit 12, and the first relay 14 is electrically connected with a first electromagnetic switch or a second relay 15. The first relay 14 is for driving of the first electromagnetic switch or the second relay 15. One end of the power management switch 10 is electrically connected with a breaker 103, and an opposite end of the breaker 103 is connected with a source of the commercial power supply. Further, the at least one standby power management switch 20 is connected by a standby power activation connector 201 and a standby power output terminal 202 to a standby power supply set 203. The at least one standby power management switch 20 is in communication connection with the power management switch 10. Each of the at least one standby power management switch 20 comprises a second power supply module 21, a second control unit 22, a second radio frequency module (RF433 MHz) 23, and a third relay 24. The second power supply module 21 is for input of power supply and detection of a state of the loading circuit 30. The second control unit 22 is for reading of a peripheral state, determination of logical operation, and control of an output operation. The first radio frequency module 13 is paired with the second radio frequency module 23 and mutually handshaking with each other for state confirmation. The second power supply module 21 is electrically connected with the second control unit 22. The second radio frequency module 23 and the third relay 24 are electrically connected with the second control unit 22, and the third relay 24 is electrically connected with a second electromagnetic switch or a fourth relay 25. The third relay 24 is for driving of the second electromagnetic switch or the fourth relay 25. The standby power supply set 203 comprises a fuel cell set, a lithium battery set, a lead acid battery set, or an electrical generator. Further, the power management switch 10 and the at least one standby power management switch 20 are paired with each other for operation, timed handshaking, and detection of a loading state. When the commercial power supply 102 supplies electricity, the at least one standby power management switch 20 turns off the second electromagnetic switch and the standby power activation connector 201, and the power management switch 10 turns on the first electromagnetic switch for electricity supply and charging of the standby power supply set 203. When electricity supply of the commercial power supply 102 is interrupted, the power management switch 10 turns off the first electromagnetic switch, and the at least one standby power management switch 20 turns on the standby power activation connector 201 to supply electricity from the standby power supply set 203.

As shown in FIG. 1A, FIG. 1A shows that when the commercial power supply 102 is present, electricity of the commercial power supply 102 is fed into the power management switch 10, and the power management switch 10 feeds the electricity to the first loading terminal 16, meanwhile the first radio frequency module 13 transmits a first detection signal to the second radio frequency module 23, indicating the electricity on the first loading terminal 16 is supplied from the power management switch 10, and the circuit between a and b and the circuit between c and d have electricity present thereon, and the standby power supply set 203 with which the at least one standby power management switch 20 is connected is not allowed to supply electricity. Further, the at least one standby power management switch 20 may be arranged as a plurality of standby power management switches 20 connected with the loading circuit 30, and including a first standby power management switch 20a, a second standby power management switch 20b, or a third standby power management switch 20c and the different ones of the standby power management switches can be controlled to individually activated. The power management switch 10 is operable for mutual signal transmission with respect to the first standby power management switch 20a, the second standby power management switch 20b, and the third standby power management switch 20c.

As shown in FIG. 1B, when the supply of electricity from the commercial power supply 102 is interrupted, a first sensor 17 of the power management switch 10 detects the interruption of electricity supply, and the first radio frequency module 13 notifies the second radio frequency module 23 of the interruption of electricity supply from the commercial power supply 102 and meanwhile, the second loading terminal 26 does not detect the commercial power supply 102 and confirms the interruption of electricity supply from the commercial power supply 102 to thereby automatically activate the standby power supply set 203 of the first standby power management switch 20a; when the standby power supply set 203 of the first standby power management switch 20a runs out of electricity, the standby power supply set 203 of the second standby power management switch 20b or the standby power supply set 203 of the third standby power management switch 20c is automatically activated. Further, one end of the loading circuit 30 is connected with the first loading terminal 16 of the power management switch 10, and another end of the loading circuit 30 is connected with the second loading terminal 26 of the at least one standby power management switch 20. The first radio frequency module 13 and the second radio frequency module 23 are set in communication connection with each other in a wireless manner, or alternatively, the first radio frequency module 13 and the second radio frequency module 23 may use the loading circuit 30 for transmission by means of cable carrier waves.

As shown in FIG. 2A, the first radio frequency module 13 and the second radio frequency module 23 maintain timely handshaking with each other for state confirmation. As shown in FIG. 2B, which is the operation flow continuing from FIG. 2A, when the commercial power supply 102 is interrupted, the at least one standby power management switch 20 identifies the loading circuit 30 is in a no-electricity state, and the standby power supply set 203 supplies electricity. As shown in FIG. 2C, which is the operation flow continuing from FIG. 2B, the power management switch 10, upon detecting the commercial power supply 102 resumes supply of electricity, notifies the standby power management switch 20 to cut off electricity supply. As shown in FIG. 2D, which is the operation flow continuing from FIG. 2C, the power management switch 10 identifies the standby power management switch 20 cuts off the supply of electricity and the loading circuit 30 is in a no-electricity state. As shown in FIG. 2E, which is the operation flow continuing from FIG. 2D, the power management switch 10 supplies electricity and the standby power supply set 203 is charged and turns off the standby power activation connector 201.

Figure 5:
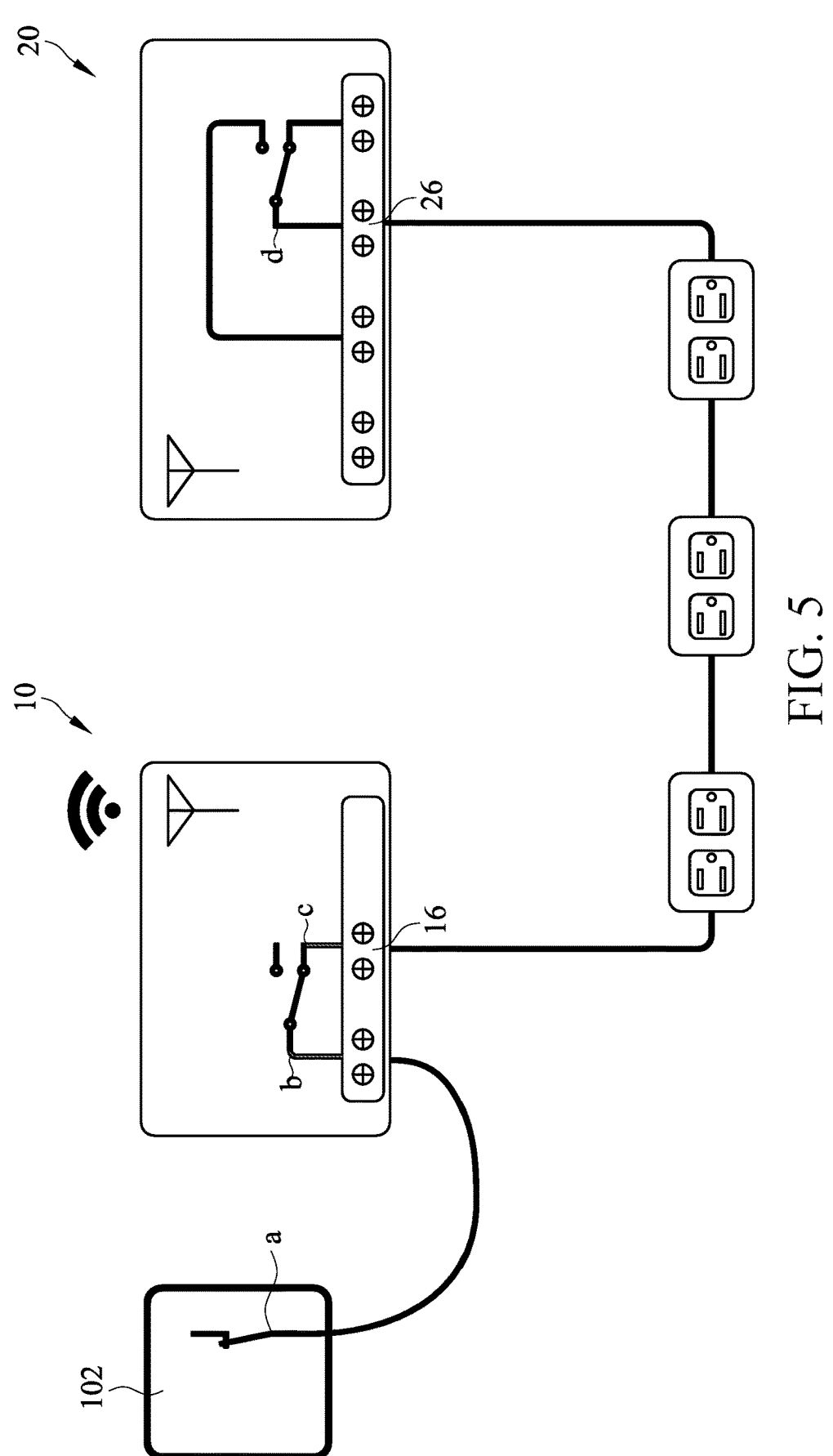
FIG. 5 is a schematic view showing EXAMPLE 1 of the distributed standby power management switch system according to the present invention.

Referring to FIG. 5, FIG. 5 is a schematic view showing EXAMPLE 1 of the distributed standby power management switch system according to the present invention.

As shown in FIG. 5, EXAMPLE 1 is a state that the commercial power supply 102 supplies electricity and the standby power supply set 203 is not yet connected, in which the at least one standby power management switch 20 is not in connection with the standby power supply set 203, and when the commercial power supply 102 normally supplies electricity, the commercial power supply 102 is fed into the power management switch 10, and electricity is present in the circuit between a and b, so that the first loading terminal 16 is supplied with electricity from the commercial power supply 102, and the first radio frequency module 13 is operable for wireless communication and the second loading terminal 26 detects electricity and electricity is present in the circuit between c and d.

Figure 6:
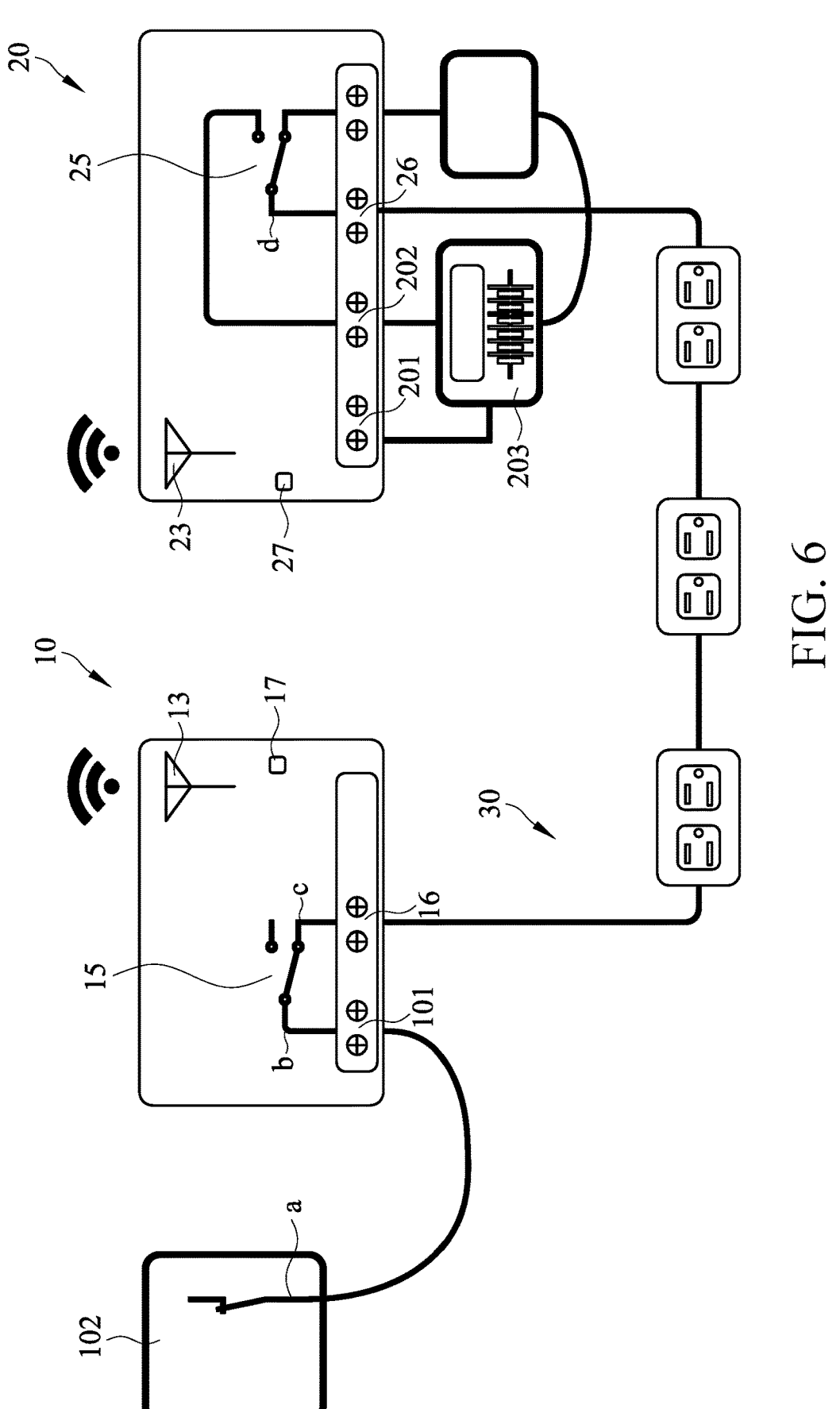
FIG. 6 is a schematic view showing EXAMPLE 2 of the distributed standby power management switch system according to the present invention.

Referring to FIG. 6, FIG. 6 is a schematic view showing EXAMPLE 2 of operation of the distributed standby power management switch system according to the present invention.

As shown in FIGS. 6, EXAMPLE 2 is a state that the commercial power supply 102 supplies electricity and the standby power supply set 203 does not supply electricity, in which, firstly, as shown in FIGS. 3, 4, and 6, a power management switch 10 and at least one standby power management switch 20 are provided such that the power management switch 10 is connected by means of an alternate-current power input terminal 101 to a commercial power supply 102, and the standby power management switch 20 is connected by means of the standby power activation connector 201 and a standby power output terminal 202 to a standby power supply set 203, and the at least one standby power management switch 20 is in communication connection with the power management switch 10. Next, a loading circuit 30 is provided such that one end of the loading circuit 30 is connected with a first loading terminal 16 of the power management switch 10, and another end of the loading circuit 30 is connected with a second loading terminal 26 of the at least one standby power management switch 20, and the loading circuit 30 is a circuit between c and d. Further, a first sensor 17 and a second sensor 27 are provided such that the first sensor 17 is arranged in the power management switch 10 and the second sensor 27 is arranged in the at least one standby power management switch 20, the first sensor 17 being operable to detect an electricity state of the power management switch 10 and generate a first detection signal, states of an alternate-current line, the loading circuit 30, and the power management switch 10 being shown with a first LED light 19, and the second sensor 27 being operable to detect an electricity state of the at least one standby power management switch 20 and generate a second detection signal, states of the standby power activation connector 201, a standby power charge port 204, and the at least one standby power management switch 20 being shown with a second LED light 29. When the commercial power supply 102 is present, electricity from the commercial power supply 102 is fed into the power management switch 10, and the power management switch 10 feeds the electricity to the first loading terminal 16, and meanwhile the first radio frequency module 13 transmits a first detection signal to the second radio frequency module 23, indicating the electricity on the first loading terminal 16 is supplied from the power management switch 10, and the circuit between a and b and the circuit between c and d have electricity present thereon, and the standby power supply set 203 with which the at least one standby power management switch 20 is connected is not allowed to supply electricity.

Figure 7:
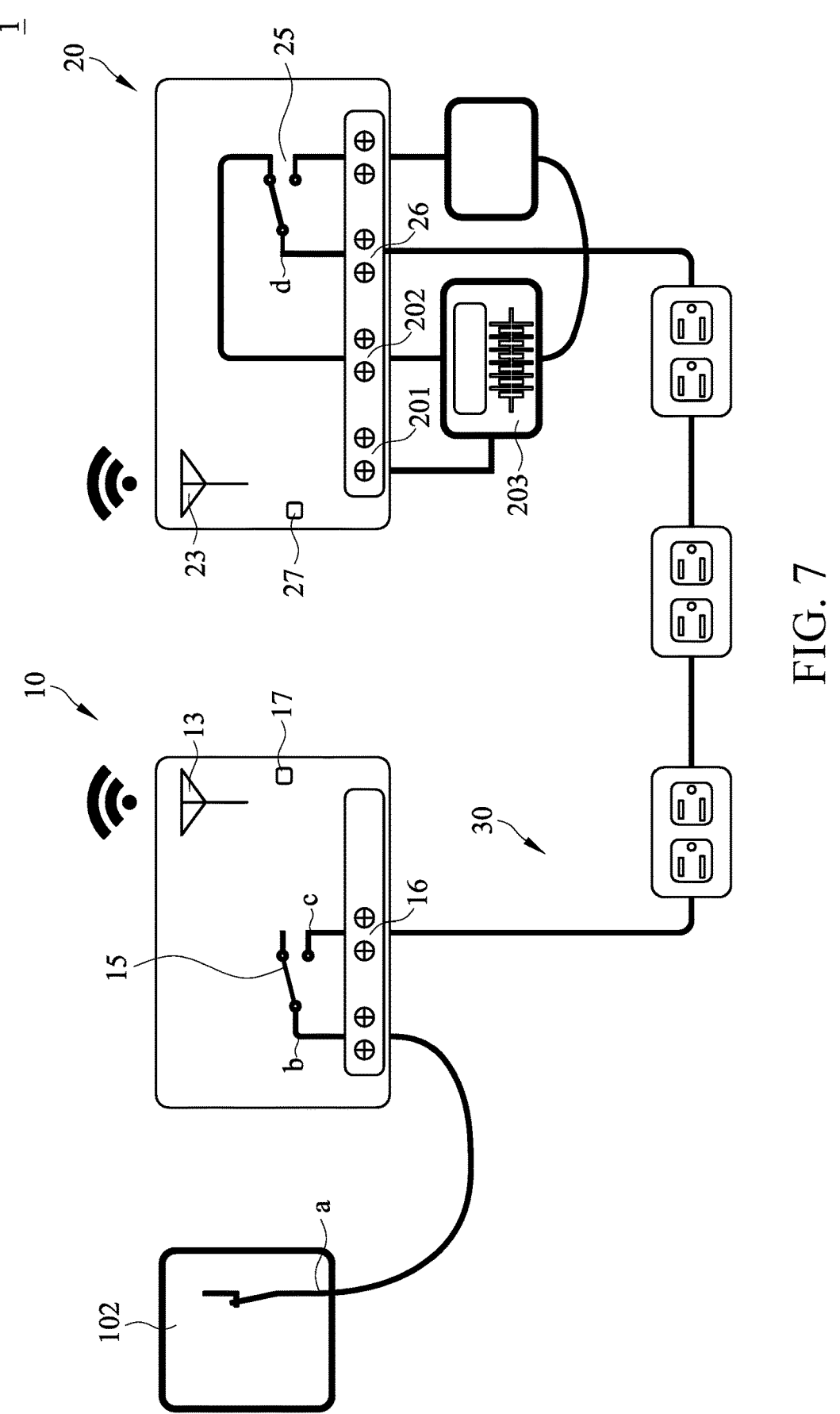
FIG. 7 is a schematic view showing EXAMPLE 3 of the distributed standby power management switch system according to the present invention.
Figure 8A:
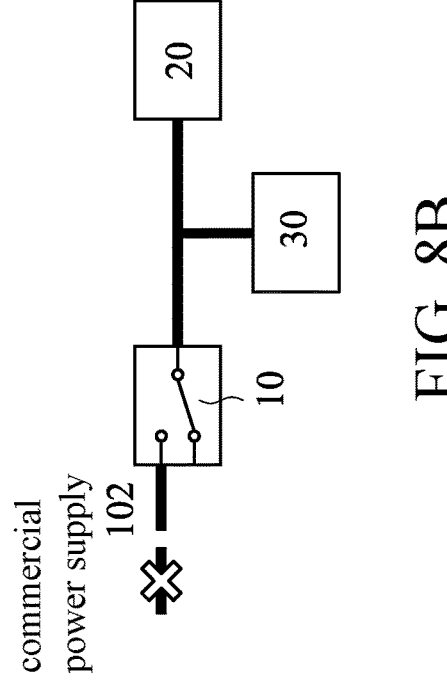
FIGS. 8A-8D are schematic views showing a commercial power supply interruption processing flow in EXAMPLE 3 of the distributed standby power management switch system according to the present invention.
Figure 8B:
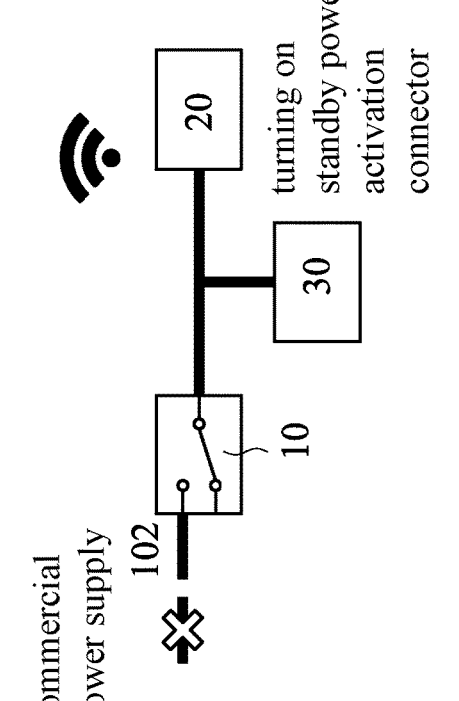
Figure 8D:
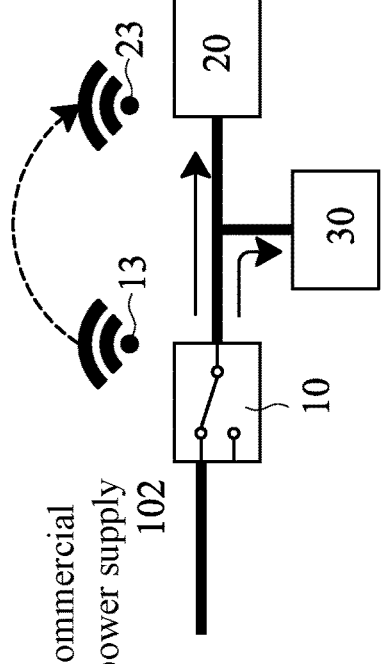
Figure 8C:
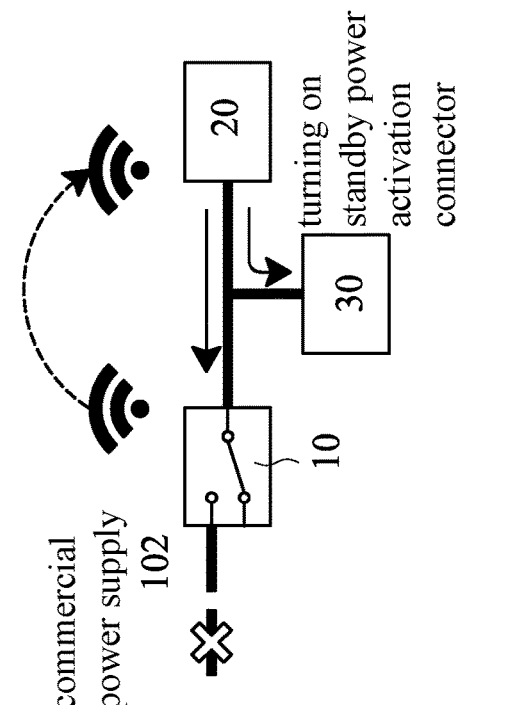

Referring to FIGS. 7 and 8D, FIG. 7 is a schematic view showing EXAMPLE 3 of the distributed standby power management switch system according to the present invention; and FIGS. 8A-8D are schematic views showing a commercial power supply interruption processing flow in EXAMPLE 3 of the distributed standby power management switch system according to the present invention.

As shown in FIGS. 7-8D, EXAMPLE 3 is a state that supply from the commercial power supply 102 is interrupted and electricity is supplied from the standby power supply set 203, in which during the interruption of the supply of the commercial power supply 102, when the commercial power supply 102 is interrupted, the first sensor 17 of the power management switch 10 detects the electricity interruption, and the first radio frequency module 13 notifies the second radio frequency module 23 that the supply of the commercial power supply 102 is interrupted, and meanwhile the second loading terminal 26 does not detect the commercial power supply 102, so that the circuit between a and b has no electricity present thereon, confirming the interruption of the commercial power supply 102, and the standby power supply set 203 is automatically activated to supply electricity to the second loading terminal 26, and electricity is supplied from the standby power supply set 203, and the first loading terminal 16 also detects the presence of electricity, so that the circuit between c and d has electricity present thereon. As shown in FIG. 8A, during the supply from the commercial power supply 102 being interrupted, the at least one standby power management switch 20 turns on the standby power activation connector 201. As shown in FIG. 8B, which is the processing flow continuing from FIG. 8A, the at least one standby power management switch 20 confirms the state of no electricity present on the loading circuit 30. As shown in FIG. 8C, which is the processing flow continuing from FIG. 8B, the standby power supply set 203 supplies electricity. As shown in FIG. 8D, which is the processing flow continuing from FIG. 8C, it is confirmed that the loading circuit 30 is in a state of having electricity present thereon, and the first radio frequency module 13 and the second radio frequency module 23 maintain timely handshaking with each other.

Figure 9:
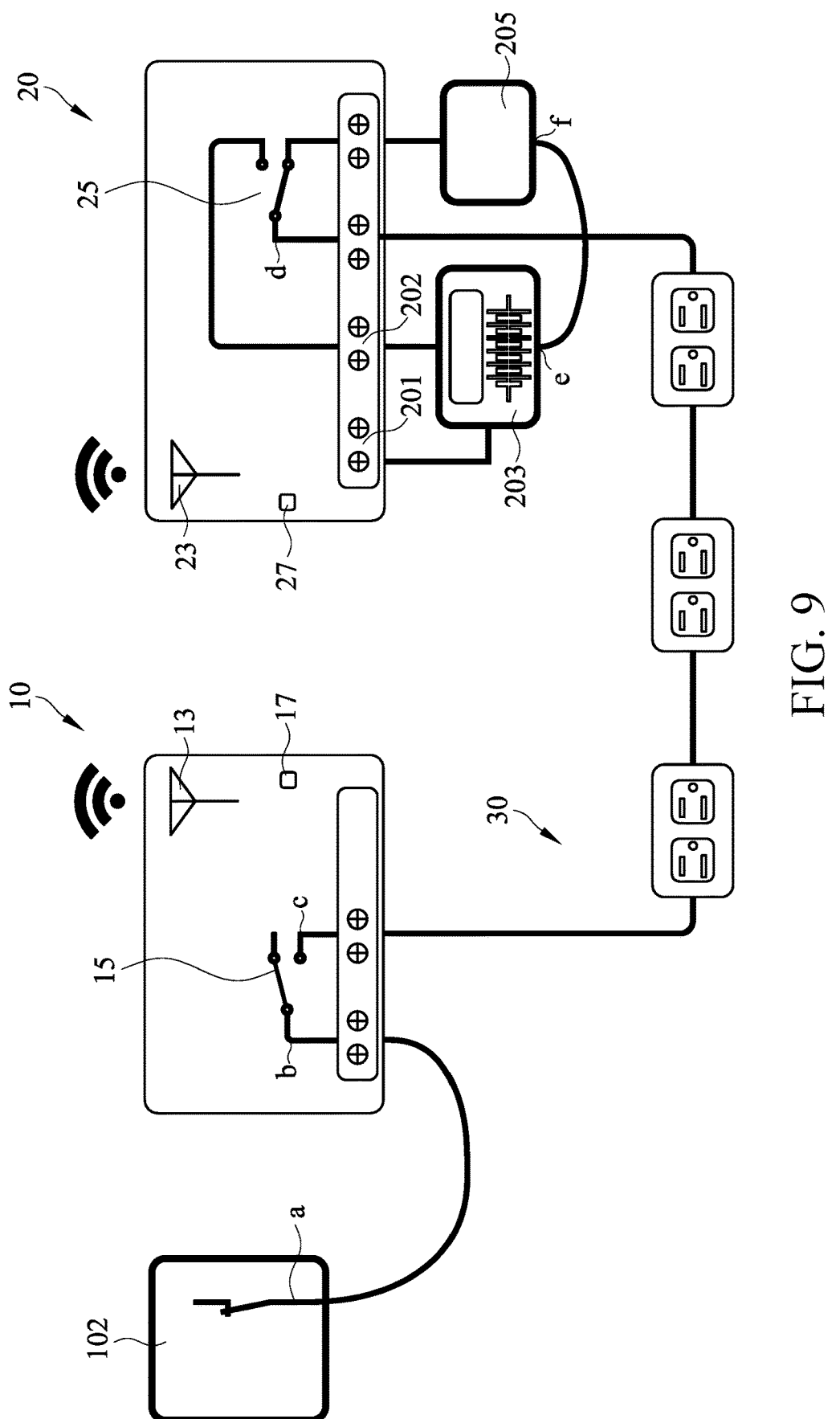
FIG. 9 is a schematic view showing EXAMPLE 4 of the distributed standby power management switch system according to the present invention.
Figure 10A:
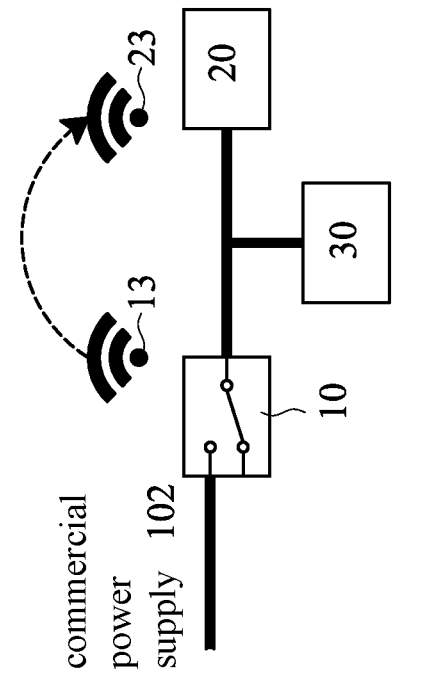
FIGS. 10A-10D are schematic views showing a commercial power supply resumption processing flow in EXAMPLE 4 of the distributed standby power management switch system according to the present invention.
Figure 10B:
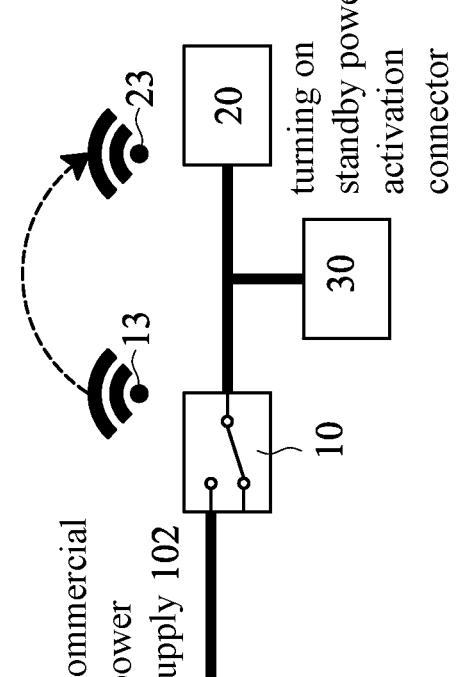
Figure 10D:
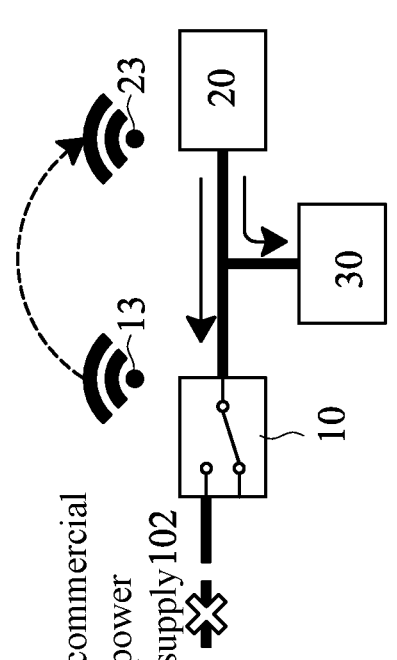

Referring to FIGS. 9-10D, FIG. 9 is a schematic view showing EXAMPLE 4 of the distributed standby power management switch system according to the present invention; and FIGS. 10A-10D are schematic views showing a commercial power supply resumption processing flow in EXAMPLE 4 of the distributed standby power management switch system according to the present invention.

FIG. 9 is a state that the commercial power supply 102 resumes supply of electricity, and the at least one standby power management switch 20 is requested to cut off supply of electricity. As shown in FIG. 9, when the commercial power supply 102 resumes the supply of electricity, the circuit between a and b has electricity present thereon, and the power management switch 10 detects the commercial power supply 102, and the power management switch 10 does not immediately feed the commercial power supply 102 into the first loading terminal 16, and instead first transmits the first detection signal to the at least one standby power management switch 20 to request for cutting of the supply of electricity, and when the at least one standby power management switch 20 completes the execution of cutting of the supply of electricity, the circuit of the loading circuit 30 (namely from c to d) has no electricity present thereon, and once the second loading terminal 26 detects no electricity, the power management switch 10 may then feed the commercial power supply 102 into the first loading terminal 16. As shown in FIG. 9, the at least one standby power management switch 20, when cutting off the supply of electricity, activates a charger device 205 through a standby power charge port 204 to apply the commercial power supply 102 to charge the standby power supply set 203, and the circuit between e and f has electricity present thereon, and after the charging, the standby power supply set 203 automatically shut down the charger device 205.

Figure 10C:
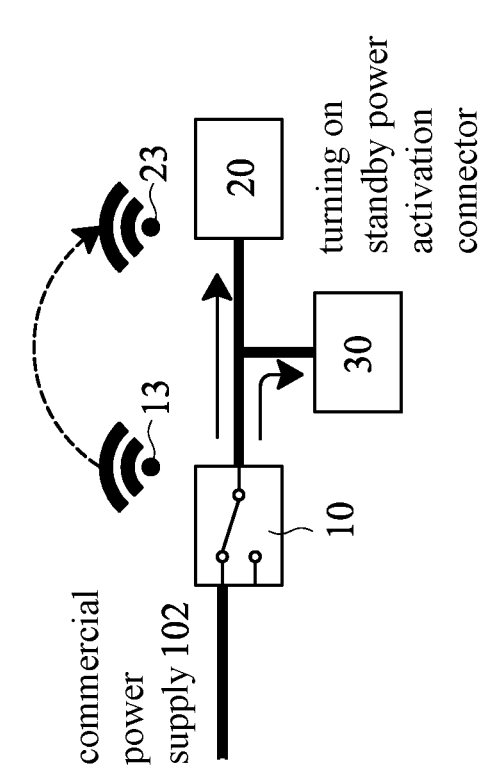

As shown in FIG. 10A, when the commercial power supply 102 resumes supply of electricity, the first radio frequency module 13 and the second radio frequency module 23 handshake with each other to confirm the state, and the second radio frequency module 23 notifies the standby power supply set 203 that is in connection with the at least one standby power management switch 20 to cut off supply of electricity and confirming no electricity present on the loading circuit 30. As shown in FIG. 10B, which is the processing flow continuing from FIG. 10A, the power management switch 10 is supplied with electricity from the commercial power supply 102. As shown in FIG. 10C, which is the processing flow continuing from FIG. 10B, it is confirmed that the loading circuit 30 is in a state of having electricity present thereon. As shown in FIG. 10D, which is the processing flow continuing from FIG. 10C, the standby power supply set 203 is being charged, and the first radio frequency module 13 and the second radio frequency module 23 maintain timely handshaking.

Figure 11:
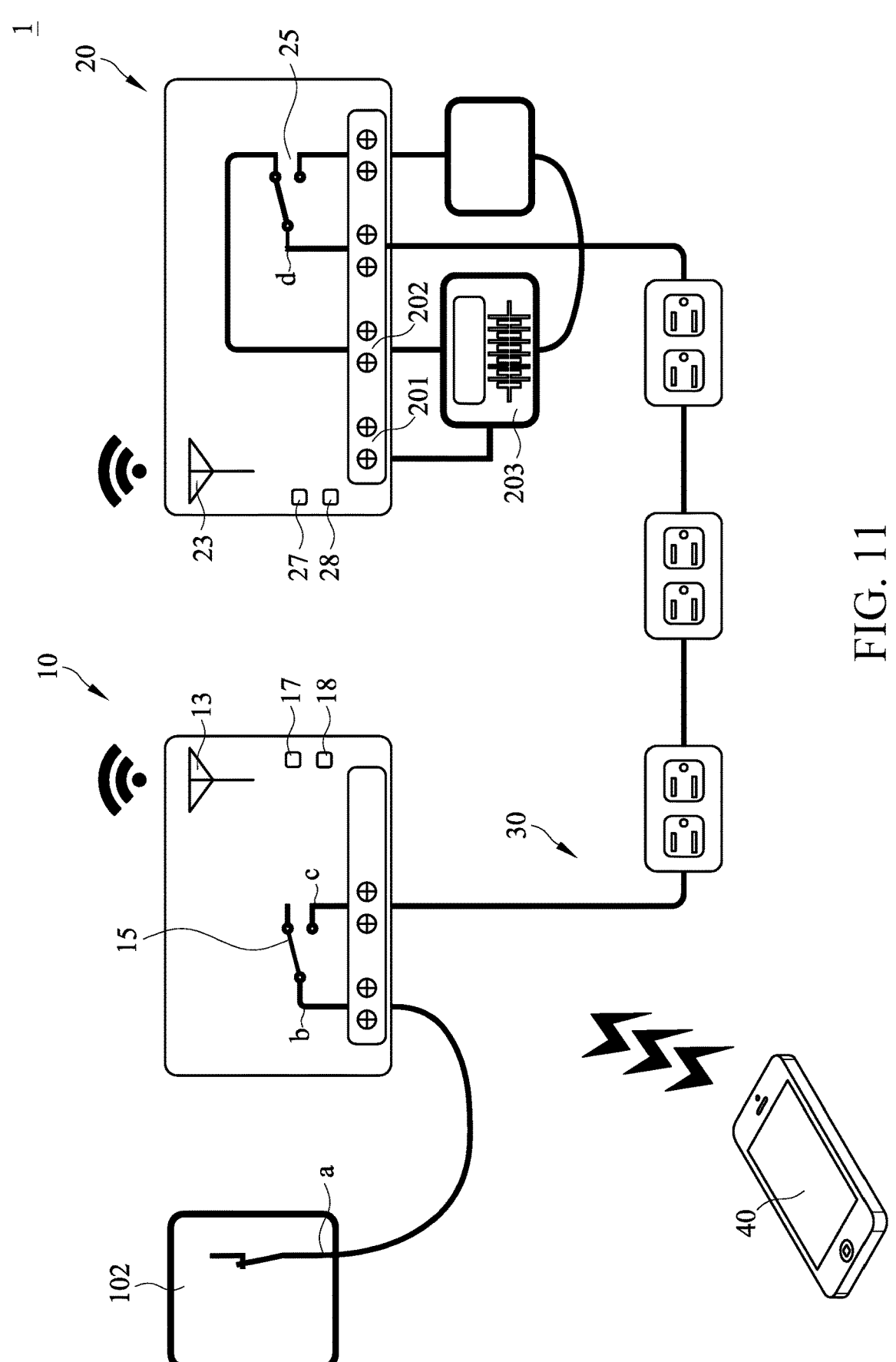
FIG. 11 is a schematic view showing EXAMPLE 5 of the distributed standby power management switch system the present invention.

Referring to FIG. 11, FIG. 11 is a schematic view showing EXAMPLE 5 of the distributed standby power management switch system the present invention.

As shown in FIGS. 3, 4 and 11, EXAMPLE 5 is a state that the supply of electricity from the commercial power supply 102 is interrupted and the standby power supply set 203 supplies electricity and a portable device 40 is in operation to receive a message, in which the power management switch system 1 further comprises a first data transmission element 18 and a second data transmission element 28. The first data transmission element 18 is arranged in the power management switch 10 and is electrically connected with the first control unit 12, and the second data transmission element 28 is arranged in the at least one standby power management switch 20 and is electrically connected with the second control unit 22. The first data transmission element 18 and the second data transmission element 28 may transmit the first detection signal and the second detection signal therebetween in a wireless manner; or alternatively, the first data transmission element 18 and the second data transmission element 28 use the loading circuit 30 for transmission by means of cable carrier waves. Further, the first detection signal and the second detection signal are transmitted, in a wireless manner, through the first data transmission element 18 and the second data transmission element 28 to the portable device 40, wherein the wireless transmission is one of Bluetooth communication protocol, wireless network communication protocol, wireless RF communication, broadband network communication, Zigbee, Thread, 3G communication protocol, 4G communication protocol, or 5G communication protocol; or using the loading circuit for transmission by means of cable carrier waves. The distributed standby power management switch system according to the present invention have the following advantages. Normally, electricity is supplied from the commercial power supply, and when the supply of electricity from the commercial power supply is interrupted, the standby power supply set automatically supplies electricity. When the commercial power supply resumes electricity supply, the standby power supply set automatically cuts off the supply of electricity and automatically connects with the commercial power supply source. Further, nonsynchronous electricity does not connect simultaneously, and no power is consumed if not in use in a normal situation. Further, the power management switch and the at least one standby power management switch may automatically switch and may be set for timed switching or to be switched by means of the portable device.

I claim:

1. A distributed standby power management switch system, comprising:

a power management switch, which is connected by means of an alternate-current power input terminal to a commercial power supply, the power management switch comprising a first power supply module, a first control unit, a first radio frequency module, and a first relay, the first power supply module being electrically connected with the first control unit, the first radio frequency module and the first relay being electrically connected with the first control unit, the first relay being electrically connected with a first electromagnetic switch or a second relay;

at least one standby power management switch, which is connected by means of a standby power activation connector and a standby power output terminal to a standby power supply set, the at least one standby power management switch being in communication connection with the power management switch, the at least one standby power management switch comprising a second power supply module, a second control unit, a second radio frequency module, and a third relay, the second power supply module being electrically connected with the second control unit, the second radio frequency module and the third relay being electrically connected with the second control unit, the third relay being electrically connected with a second electromagnetic switch or a fourth relay;

a loading circuit, which has one end connected to a first loading terminal of the power management switch, the loading circuit having another end connected to a second loading terminal of the at least one standby power management switch, wherein the loading circuit selectively receives a supply of electricity from one of the commercial power supply and the standby power supply set respectively fed from the power management switch and at least one standby power management switch through the first loading the first loading terminal and the second loading terminal;

wherein the first radio frequency module and the second radio frequency module are in communication connection with each other;

wherein the standby power supply set is selected from a group consisting of a fuel cell set, a lithium battery set, a lead acid battery set and an electrical generator; and wherein the power management switch is operable to signal the at least one standby power management switch through the communication connection to selectively indicate one of a first event and a second event, wherein in the first event, the supply of electricity is fed from the commercial power supply through the first loading terminal of the power management switch to the loading circuit, such that the at least one standby power management switch receives the signal and deactivates the supply of electricity from the standby power supply set through the second loading terminal to the loading circuit and in the second event, the supply of electricity fed from the commercial power supply through the first loading terminal being interrupted, and the at least one standby power management switch receives the signal, in response to which the at least one standby power management switch first confirms the interruption of the supply of electricity from the commercial power supply by detecting no power at the second loading terminal and activates, after the confirmation, the supply of electricity from the standby power supply set through the second loading terminal to the loading circuit.

2. The distributed standby power management switch system according to claim 1, wherein the communication connection between the first radio frequency module and the second radio frequency module comprises one of wireless communication and transmission with cabled carrier wave through the loading circuit.

3. The distributed standby power management switch system according to claim 1, wherein the power management switch comprises a first sensor, which is operable to detect an electricity state of the power management switch and to generate a first detection signal to have the state of the power management switch displayed with a first LED light, and the at least one standby power management switch comprises a second sensor, which is operable to detect an electricity state of the at least one standby power management switch and to generate a second detection signal to have the state of the at least one standby power management switch displayed with a second LED light.

4. The distributed standby power management switch system according to claim 3, further comprising a first data transmission element and a second data transmission element, the first data transmission element being arranged in the power management switch and electrically connected with the first control unit, the second data transmission element being arranged in the at least one standby power management switch and electrically connected with the second control unit, wherein the first data transmission element and the second data transmission element are operable to transmit the first detection signal and the second detection signal therebetween in a wireless manner; or alternatively, the first data transmission element and the second data transmission element are operable to use the loading circuit for transmission with cabled carrier wave, the first detection signal and the second detection signal being transmitted through the first data transmission element and the second data transmission element to a portable device in a wireless manner.

5. The distributed standby power management switch system according to claim 4, wherein the wireless manner comprises one of Bluetooth communication protocol, wireless network communication protocol, wireless RF communication, broadband network communication, Zigbee, Thread, 3G communication protocol, 4G communication protocol, or 5G communication protocol; or alternatively, using the loading circuit for transmission with cable carrier wave.

6. The distributed standby power management switch system according to claim 1, further comprising a breaker, the breaker having one end connected with the commercial power supply source and another end electrically connected with the power management switch.

7. A method of use of a distributed standby power management switch system, comprising:

providing a power management switch and at least one standby power management switch, wherein the power management switch is connected by means of an alternate-current power input terminal to a commercial power supply, and the at least one standby power management switch is connected by means of a standby power activation connector and a standby power output terminal to a standby power supply set, the at least one standby power management switch and the power management switch being in communication connection with each other, the standby power supply set being electrically connected with the at least one standby power management switch;

providing a loading circuit, wherein one end of the loading circuit is connected with a first loading terminal of the power management switch, and another end of the loading circuit is connected with a second loading terminal of the at least one standby power management switch; and providing a first sensor and a second sensor, wherein the first sensor is arranged in the power management switch, and the second sensor is arranged in the at least one standby power management switch, the first sensor being operable to detect an electricity state of the power management switch and to generate a first detection signal to have the state of the power management switch displayed with a first LED light, the second sensor being operable to detect an electricity state of the standby power management switch and to generate a second detection signal to have the state of the at least one standby power management switch displayed with a second LED light;

wherein when the commercial power supply is present, before the power management switch feeds electricity to the first loading terminal, the first radio frequency module transmits the first detection signal to the second radio frequency module, indicating the electricity on the first loading terminal will be supplied from the power management switch, the standby power supply set connected with the at least one standby power management switch being prohibited from supplying electricity, and wherein when the commercial power supply is interrupted, the first sensor of the power management switch detects the interruption, and the wireless communication between the first radio frequency module and the second radio frequency module is broken, and the second loading terminal detects no electricity, confirming the commercial power supply is interrupted, and the standby power supply set is then activated to supply electricity to the second loading terminal, and along the loading circuit, and the first loading terminal of the power management switch also detects electricity, wherein under this condition, the standby power supply set supplies electricity.

8. The method of use according to claim 7, wherein when the commercial power supply resumes, the power management switch detects the commercial power supply, and the power management switch does not immediately feed the commercial power supply to the first loading terminal, and instead, firstly transmits the first detection signal to the at least one standby power management switch to request interruption of supply of electricity, and only after the at least one standby power management switch completes execution of the interruption of supply of electricity and the second loading terminal detects no electricity, the power management switch feeds the commercial power supply to the first loading terminal.

9. The method of use according to claim 8, wherein the at least one standby power management switch, under the condition that the commercial power supply is present and the standby power management switch interrupts supply of electricity to the loading circuit, activates a charger device to apply the commercial power supply to charge the standby power supply set, and automatically shuts down the charger device upon completion of the charging.

\* \* \* \* \*